Aug. 5, 1924.
F. J. SNOOK
1,503,855
COVER AND OPENING OF HERMETICALLY SEALED TINS
Filed March 8, 1923    2 Sheets-Sheet 1
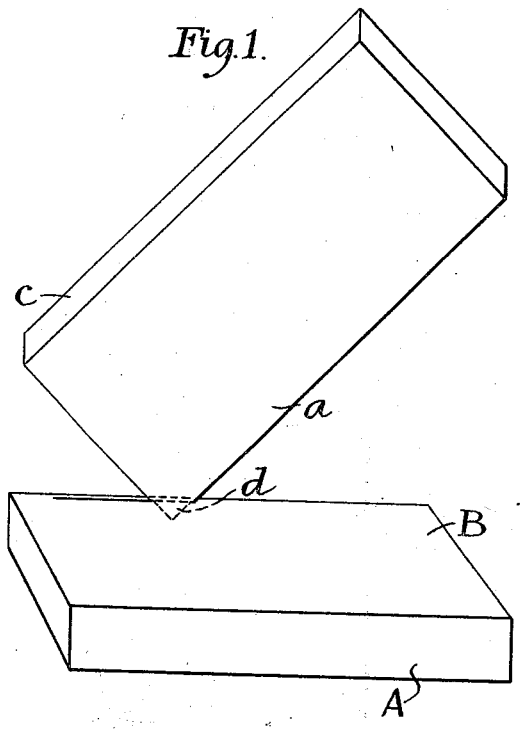
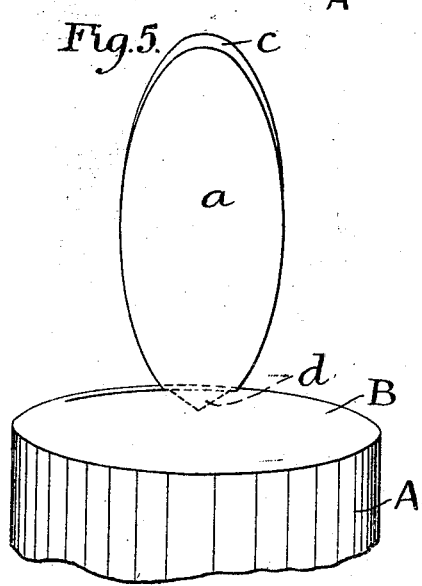
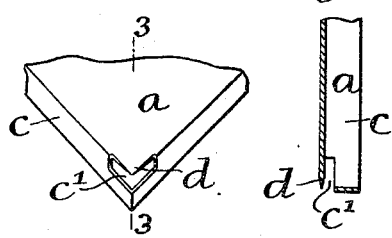
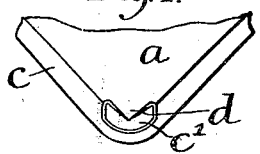
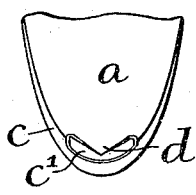
Inventor:
F. J. Snook
By George A. Prevost
atty.

Aug. 5, 1924.  
F. J. SNOOK  
1,503,855  
COVER AND OPENING OF HERMETICALLY SEALED TINS  
Filed March 8, 1923   2 Sheets-Sheet 2

Inventor:  
F. J. Snook  
By George A. Prevost  
atty.

Patented Aug. 5, 1924.

1,503,855

UNITED STATES PATENT OFFICE.

FREDERICK JOSEPH SNOOK, OF SALISBURY, ENGLAND.

COVER AND OPENING OF HERMETICALLY-SEALED TINS.

Application filed March 8, 1923. Serial No. 623,672.

*To all whom may concern:*

Be it known that I, FREDERICK JOSEPH SNOOK, a subject of the King of Great Britain, residing at 9 Wyndham Road, Salisbury, Wiltshire, England, have invented new and useful Improvements Relating to the Covers and Opening of Hermetically-Sealed Tins, of which the following is a specification.

My invention relates to hermetically sealed tins fitted with slip-on lids and has for its object to so construct the lids that they can be utilized for opening the tins.

My improvements in no way impair the usefulness of the slip-on lid and do not involve the addition and fixing of any knife or cutter to the said lid. Moreover, the lid is always ready for use, requires no adjustment, and the construction effects considerable economy in manufacture.

In the accompanying drawings—

Figure 1 is a perspective view of a sealed tin of rectangular form in plan with square corners, the slip-on lid of which is constructed in accordance with the invention and shown in position for cutting round the sealed tagger top.

Figure 2 is a perspective view showing the cutter portion of the rectangular lid.

Figure 3 is a section on the line 3—3, Figure 2.

Figure 4 is a view similar to Figure 2, but illustrating a rectangular lid with rounded corners.

Figures 5 and 6 are views similar to Figures 1 and 2, respectively, showing the invention applied to a sealed tin of oval form in plan.

A is the tin hermetically sealed by the tagger top B and $a$ is the ordinary slip-on lid having the rim or flange $c$ designed to fit on the body of the said tin A.

Figure 7:
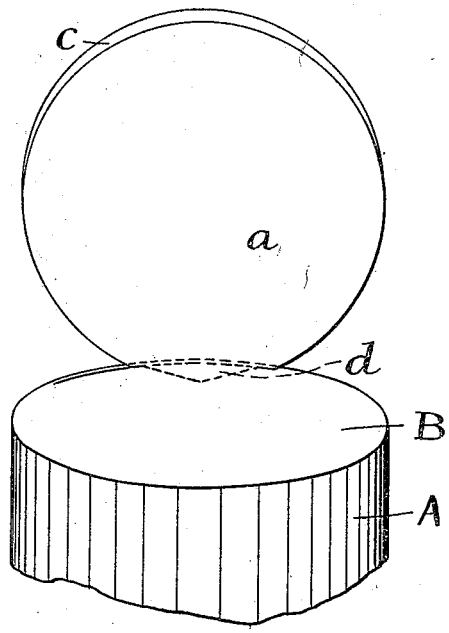
Figures 7 and 8 are also views similar to Figures 1 and 2, showing the invention applied to a sealed tin of circular form in plan.
Figure 8:
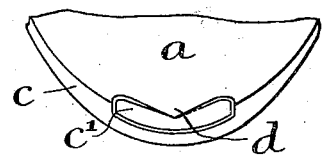

In carrying out the invention a portion of the flange $c$ of the lid $a$ adjacent to the top of the latter is cut away, in the case of the rectangular lids shown in Figures 1 to 3 and Figure 4, at one of the corners, in the case of the oval lid shown in Figures 5 and 6, at one end, and in the case of the circular lid shown in Figures 7 and 8, at any point in its circumference to provide an aperture $c^1$ and a tongue of metal $d$. This tongue, in the case of the top with square corners, is of pointed form, and, in the case of the oval and round lids and rectangular lids with round corners, the sides of the tongue are cut to a pointed form, so that in each instance a broad pointed tongue is provided which has its point projecting immediately over the aperture $c^1$, but which terminates slightly to the inside of the flange. This broad tongue forms the cutter for opening the tins.

In the operation of opening either form of tin the slip-on lid $a$ is removed from the tin A and is held on its edge with the cutter $d$ pointing downwards and with the top side of the lid facing inwards towards the tagger top B, as indicated in Figures 1, 5 and 7, the cut away edge of the lower portion of the flange $c$ bearing against the side of the tin A. The lid is then pressed firmly downwards causing the cutter $d$ to pierce the tagger top B near its edge. The lid is then forced completely round the top of the tin near the edge thereof, it being guided in its course by the cutter $d$ inside the tin and the flange $c$ outside the tin, this operation resulting in the complete cutting out of the said top. The lid $a$ after the removal of the top B, may be replaced and used as an ordinary lid to close the tin.

Claim:

The combination with a tin hermetically sealed with a tagger top, of a slip-on lid which is cut away to form an aperture in its flange and to leave or form a pointed cutting tongue on and in the plane of the lid itself, so that the lid when held on its edge with the cutting tongue downwards towards the tagger top may be pressed downwards to pierce the said top and then be forced edgeways, guided by the cutter inside the tin and the flange of the lid outside the tin, to cut round the said top.

FREDERICK JOSEPH SNOOK.